United States Patent [19]
Portelli

[11] 3,763,826
[45] Oct. 9, 1973

[54] AUTOMATIC PET FOOD DISPENSER

[76] Inventor: Sam Portelli, 14747 Archwood St., Van Nuys, Calif.

[22] Filed: Feb. 23, 1972

[21] Appl. No.: 228,497

[52] U.S. Cl. ............................................. 119/52 R
[51] Int. Cl. ............................................. A01k 05/00
[58] Field of Search ................... 119/51, 52 R, 51.5, 119/53, 53.5, 54

[56] References Cited
UNITED STATES PATENTS

| | | |
|---|---|---|
| 396,563 | 1/1889 | Hawkins .............................. 119/53 |
| 886,806 | 5/1908 | Hoffmann ......................... 119/52 R |
| 947,262 | 1/1910 | Storelee .............................. 119/53 |
| 962,635 | 6/1910 | Griner ................................. 119/53 |
| 1,096,703 | 5/1914 | Fleury .............................. 119/53.5 |

*Primary Examiner*—Hugh R. Chamblee
*Attorney*—John J. Posta, Jr.

[57] ABSTRACT

An automatic pet food dispenser, preferably portable, comprises an inclined feed board, preferably grooved for food retention, a flat base and raised sides connected to the board, a raised collar secured to the board adjacent the rear end of the upper surface thereof and a funnel shaped hollow container, preferably having a closable top, the container having an opening in the lower front portion thereof substantially matching a like opening in the collar. The container may be fixedly or releasably secured to the collar and contains feed measuring means on at least one surface thereof.

10 Claims, 4 Drawing Figures

PATENTED OCT 9 1973  3,763,826

AUTOMATIC PET FOOD DISPENSER

BACKGROUND OF THE INVENTION

1. Field of the Invention

The present invention relates to animal feeders, particularly of the portable pet feeding type.

2. Description of Prior Art

Some animal feeders are complicated and expensive and/or cumbersome and many are not adapted for use with dry particulate feeds. Most pet feeders, if simple in construction, are not automatic and do not provide adequate means for measurement and protection of dry particulate feed stored therein. Moreover, the size and nature of many of such feeders renders them non-portable and, thus, inconvenient to use. Furthermore, many of such feeders do not provide adequate means for the controlled release of dry particulate feed therefrom; consequently, inadequate or excessive feed supply rates may be encountered. Some feeders, due to the arrangement of their components also are difficult to clean and to maintain and/or to supply with controlled amounts of such feed. Since dry particulate feeds are usually sold in disposable cartons or bags it would be desirable to provide improved automatic pet food dispensing means which would simplify the transfer and measurement of such feed and also avoid contamination thereof.

SUMMARY OF THE INVENTION

The automatic pet food dispenser of the invention is substantially as set forth in the Abstract above. It is particularly adapted for the automatic feeding of household and yard pets such as dogs, cats, rabbits, guinea pigs and the like. Thus, the container of the dispenser can be filled and the pet then exposes the feed only as and at the rate it eats the feed. The dispenser can be made portable, is easily cleaned and filled, affords means for measuring the amounts of any particulate feed supplied and used, and has means for controlling the rate of release of such feed from the storage container thereof. It fully protects such stored feed against contamination. Moreover, the dispenser is simple, durable and inexpensive.

In one embodiment, the storage container portion of the dispenser comprises a point-of-sale dry particulate pet food package which is of such shape, size and construction as to facilitate shelf display and storage before and after sale. In this regard, the container preferably has square sides for eaxe of stacking and shelf display. The container may be a disposable paper, paperboard, fiberboard or similar carton with a perforted flap area from which, after the flap is removed, the feed will be controllably released from the container in the dispenser.

DESCRIPTION OF THE PREFERRED EMBODIMENT

Figure 1:
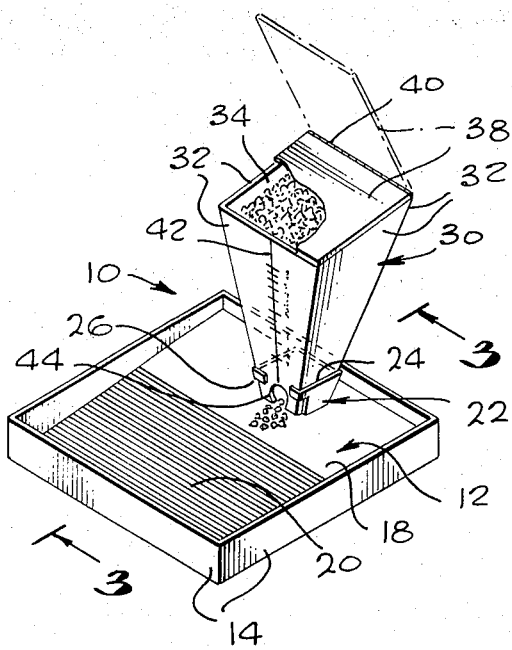
FIG. 1 is a schematic perspective view of a first embodiment of the dispenser of the invention with a portion of the lid thereof broken away.
Figure 3:
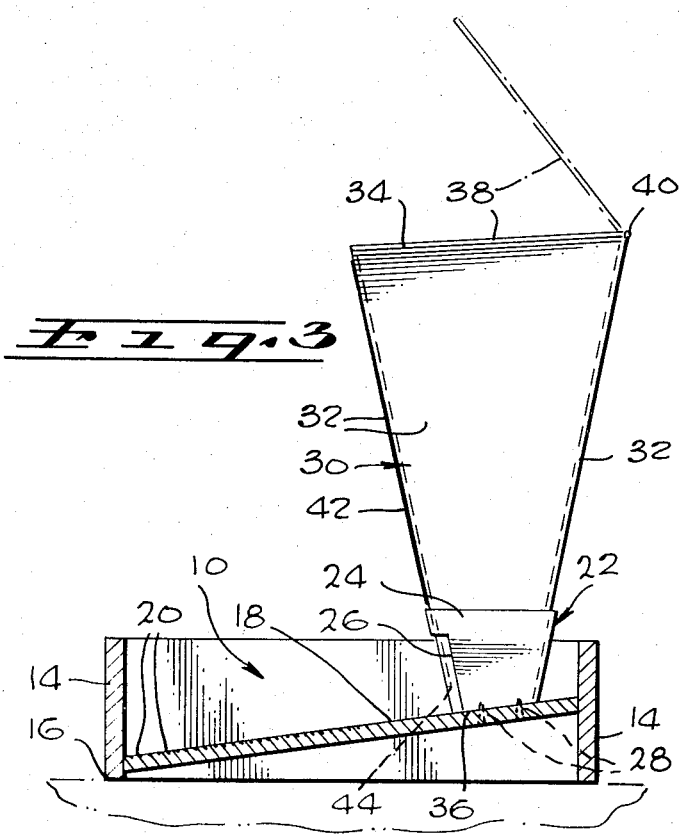
FIG. 3 is a section taken along the section line 3—3 of FIG. 1.

A first embodiment of the improved automatic pet food dispenser of the invention is shown schematically in FIGS. 1 and 3 of the drawings. Referring specifically to FIG. 1, an automatic dry particulate pet food dispenser 10 is shown, which includes an inclined feed board 12, generally square or rectangular, supported in the forwardly inclined position by connection with sides 14 which are raised above the level of board 12 and which extend below that level to cooperatively form a flat base 16 (as shown particularly in FIG. 3). It will be understood that the base could, if desired, be formed from a separate board or the like secured to the lower ends of sides 14.

Preferably, the upper surface 18 of board 12 includes a plurality of shallow transverse grooves or ribs 20 which aid in regulating the rate of dispersal of feed over surface 18. Grooves 20 are shallow enough so as not to impede removal of feed from surface 18, and have the advantage of trapping fines which the pet ordinarily would not eat. The board, sides and base can be fabricated of any durable, cleanable material, preferable sheet metal or the like.

Extending upwardly from surface 18 and secured thereto, is a hollow collar 22, preferably fabricated of sheet metal, although plastic, wood and the like are also suitable. Collar 22 is provided with interconnected upwardly and outwardly sloping sides 24 and a cutaway front portion 26. Collar 22 is secured to surface 18, as by nails, screws or the like, generally shown in FIG. 3 and designated by the numeral 28.

A dry particulate feed container 30 is provided, as shown in FIGS. 1 and 3, which is hollow and generally funnel shaped. Container 30 can be fabricated of sheet metal or other easily cleanable material, such as wood, plastic or the like. Container 30 preferably includes four inter-connected downwardly and inwardly sloping walls 32, open upper and lower ends 34 and 36, respectively, and an openable upper lid 38 hingedly secured to a wall 32 by a hinge 40.

Preferably, container 30 is squqre, rectangular or otherwise polygonal in horizontal cross-section. This is to facilitate controlled release of dry feed from container 30 by the natural feed-delaying action afforded by the sharp angled corners of the container. Moreover, when so configured, container 30 can be more easily stored without rolling, as opposed to oval or circular (in cross-section) containers. The lower end of container 30 is configured relative to collar 22 so as to be slidably received therein for secure frictional fitting. Although container 30 can be fixedly secured in collar 22, it is preferred to have it releasably secured to facilitate periodic cleaning thereof and for storage purposes.

Container 30 may include feed measuring indicia disposed on the outer or inner surface of at least one of the walls 32 thereof. As shown in FIG. 1, indicia 42 are disposed on the outer surface of front wall 32. Indicia 42 can be a decal, embossing, engraving or the like, on the appropriate surface or surfaces in the form of, for example, a graduated scale. A comparison of the feed level in container 30 (with lid 38 raised) with the scale of indicia 42 indicates how much feed is left in container 30.

Container 30 includes dispensing means in the form of a small opening 44 adjacent end 36 in front wall 32.

Opening 44 is disposed in cut-away portion 26 of collar 22 so that dry particulate feed can flow unimpeded therefrom unto surface 18.

Dispenser 10 is compact, inexpensive and durable. Dry particulate feed disposed in container 30 automatically dispenses from opening 44 as room on surface 18 is made available for the same (by the pet feeding therefrom) and is distributed on surface 18 uniformly by grooves 20. The weight of the feed in container 30, heighth of sides 14, the shape of container 30 and the size of opening 44 are such as to prevent uncontrolled pouring of the feed from container 30.

Container 30 can be removed from collar 22 for cleaning and storage of dispenser 10. Dispenser 10 can be made light and portable to facilitate such cleaning and storage. Lid 38 and walls 32 also protect the feed from contamination before use, so that the device is sanitary.

Figure 2:
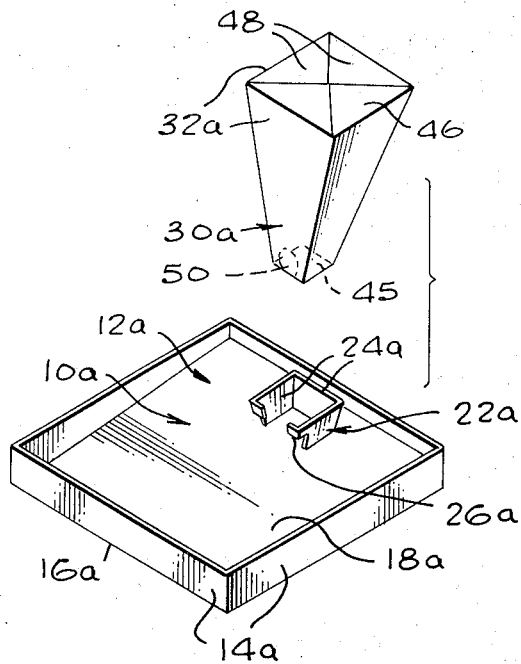
FIG. 2 is a schematic perspective of a second embodiment of the dispenser of the invention.
Figure 4:
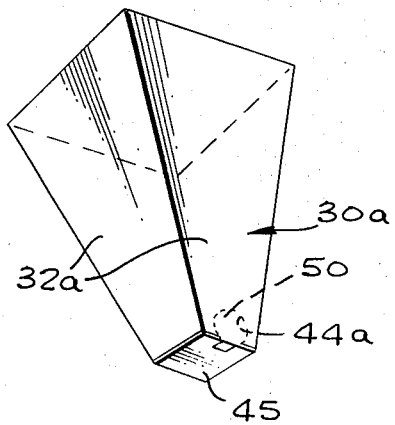
FIG. 4 is an enlarged perspective view of the container of FIG. 2.

A second embodiment of the dispenser of the invention is schematically depicted in FIGS. 2 and 4. Components of the device similar to those of FIGS. 1 and 3 bear the same numeral designations followed by the letter "a." Thus, FIG. 2 disclosed a dispenser 10a which includes an inclined board 12a with an upper surface 18a (which in this instance is ungrooved), raised sides 14a including base 16a secured thereto, a collar 22a having sides 24a and a cut-away portion 26a secured to surface 18a, and a container 30a releasably disposable in collar 22a.

Container 30a includes downwardly and inwardly sloped walls 32a fabricated, preferably, of paper, paperboard, fiberboard or other fibrous cellulosic material. Container 30a includes downwardly and inwardly sloped walls 32a fabricated preferably of paper, paperboard, fiberboard or other fibrous cellulosic material. Container 30a may also be provided with a closed bottom portion 45 and a top closure 46, the latter of which may comprise a plurality of overlapping closure flaps 48.

Dispensing means are provided at the lower end of one wall 32a in the form of a closed perforated flap 50 which is stripable from that wall 32a to form an opening 44a for dispensing of feed in the manner described for opening 44. Container 30a can be, for example, the point-of-sale dry pet food package itself which can be slipped into and is held by collar 22a before and after removal of flap 50 to complete the present dispenser 10a. After container 30a is empty, it can be removed for collar 22a and disposed of. A new filled container 30a can then be substituted therefor. Accordingly, improved ease and convenience for inexpensive automatic pet food feeding in an improved device is provided.

What is claimed and desired to be secured by Letters Patent is:

1. An automatic pet food dispenser comprising, in combination:
   an inclined feed board,
   a base and raised sides connected to said board,
   a raised collar secured to the upper surface of said board, and
   a hollow funnel-shaped container secured adjacent its lower end in said collar, said container including adjacent its lower end dispensing means for releasing pet food from said container to said feed board.

2. The dispenser of claim 1 wherein said dispenser is portable and wherein said container includes an openable closure at the upper end thereof and is adapted for use with dry particulate feed.

3. The dispenser of claim 2 wherein said closure is hinged, wherein said dispensing means comprises a relatively small opening in the front of said container, and wherein said collar is generally centrally disposed adjacent the rear end of said board.

4. The dispenser of claim 3 wherein said container is generally polygonal in horizontal cross-section and includes feed measuring indicia on at least one surface thereof, wherein said collar includes a forwardly disposed cut-away portion and wherein said base is generally flat.

5. The dispenser of claim 4 wherein said base, sides, container, board and collar comprise metal and wherein the upper surface of said board includes a plurality of shallow transverse grooves.

6. The dispenser of claim 2 wherein said container is disposable and is separate from and releasably insertable in said collar and includes a closed bottom, wherein said closure comprises a releasably folded top for said container, and wherein said dispensing means comprises a small closed flap separable from the body of said container adjacent the lower front end thereof.

7. The dispenser of claim 6 wherein said base is flat and wherein said collar is generally centrally disposed adjacent the rear end of said board.

8. The dispenser of claim 7 wherein said container is generally polygonal in horizontal cross-section, wherein said collar includes a forwardly disposed cut-away portion generally matching said flap and wherein said flap comprises a perforated portion of said container.

9. The dispenser of claim 8 wherein the upper surface of said board includes a plurality of shallow transverse grooves and wherein said container includes feed measuring indicia on at least one surface thereof.

10. The dispenser of claim 9 wherein said container comprises self-supporting fibrous cellulosic material and said board, base, sides and collar comprise metal.

* * * * *